D. Edward. Mop and Brush Holder.

116574　　PATENTED JUL. 4 1871.

Witnesses:
A. W. Almqvist
Wm. H. C. Smith

Inventor:
D. Edward
PER
Attorneys.

UNITED STATES PATENT OFFICE.

DAVID EDWARD, OF MONTREAL, CANADA.

IMPROVEMENT IN MOP AND BRUSH-HOLDERS.

Specification forming part of Letters Patent No. 116,574, dated July 4, 1871.

*To all whom it may concern:*

Be it known that I, DAVID EDWARD, of Montreal, in the Province of Quebec and Dominion of Canada, have invented a new and useful Improvement in Mop and Brush-Holder; and I do hereby declare that the following is a full, clear, and exact description thereof, which will enable others skilled in the art to make and use the same, reference being had to the accompanying drawing forming part of this specification, in which—

Figure 1:
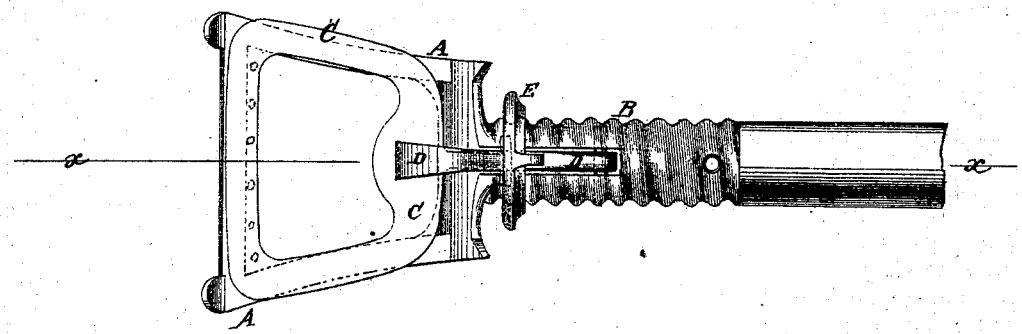
Figure 2:
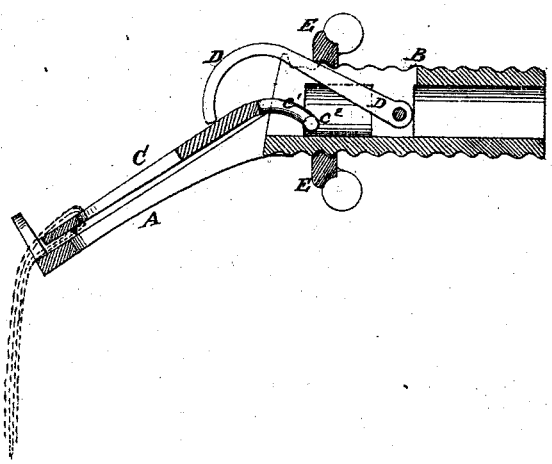

Figure 1 is a top view of my improved holder. Fig. 2 is a detail sectional view of the same taken through the line $x\,x$, Fig. 1.

Similar letters of reference indicate corresponding parts.

My invention has for its object to furnish an improved holder for mops, swabs, brushes, &c., for mopping, scrubbing, cleaning, sweeping, &c., which shall be simple in construction and effectual in operation, holding securely the brushes and the rags, old cloths, &c., which may be used for the mop; and it consists in the construction and combination of the various parts of the device, as hereinafter more fully described.

A is the main plate of the holder, which is cast solid with the shank B that receives the handle. The plate A is made at an angle with the shank B, and has projecting lugs formed upon the upper side of the ends of its forward edge, to better adapt it for holding the mop, and between which the stock of the brush is placed. The middle part of the plate A is cut away to make the holder lighter and to form a bar around which the mop may be passed. C is the upper or clamping-plate, the middle part of which is also cut away, and which has teeth or prongs upon the under side of its forward edge to enable it to take a firmer hold upon the mop or brush-stock, and prevent the slipping of the said mop or stock. The shank B is made hollow, and its lower part is slotted to receive the short curved shank $c^1$ of the plate C, the end of which has a cross-head, $c^2$, formed upon it, which cross-head rests against the inner side of the lower end of the shank B, as shown in Fig. 2, and in dotted lines in Fig. 1. By this construction, by raising the plate C and turning it about one-quarter around, the cross-head of its shank will come in line with the slot of the shank B, so that the said plate can be conveniently detached when desired. D is the hooked or curved bar. The upper end or shank enters the upper part of the slot in the shank B, where it is pivoted by a pin or rivet that passes through the shank B, and through a hole in the end of the bar D. The lower end of the bar D rests against the outer side of the upper part of the plate C, and holds the said plate securely in place. The outer surface of the shank B has a screw-thread cast upon it, into which fits the screw-thread cast upon the inner surface of the hand-nut E, so that by screwing down the nut E the curved bar D may be forced down upon the plate C, holding said plate securely in place, firmly clamping the mop or brush-stock. In the case of brushes, &c., the plate C may be removed if desired, and the stock clamped to the plate A by means of the hook or curved bar D.

Having thus described my invention, I claim as new and desire to secure by Letters Patent—

The hook or curved bar D, hand-nut E, plate A, and hollow shank B, having a slot formed in its lower part and a screw-thread upon its outer surface, in combination with each other, whether the plate C be used or not, substantially as herein shown and described.

DAVID EDWARD.

Witnesses:
G. DESÈVE,
Z. PERRAULT.